June 20, 1950 M. H. SUSSIN 2,512,182
PHOTOENGRAVING COPYHOLDER
Filed Sept. 30, 1946 5 Sheets-Sheet 1

INVENTOR.
Max H. Sussin
BY
Louis Robertson Att'y.

June 20, 1950 M. H. SUSSIN 2,512,182
PHOTOENGRAVING COPYHOLDER
Filed Sept. 30, 1946 5 Sheets-Sheet 2
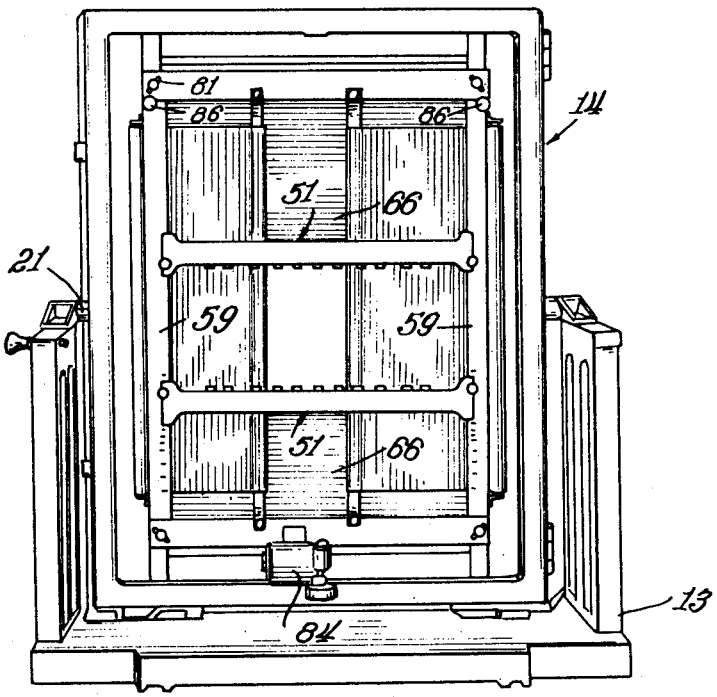
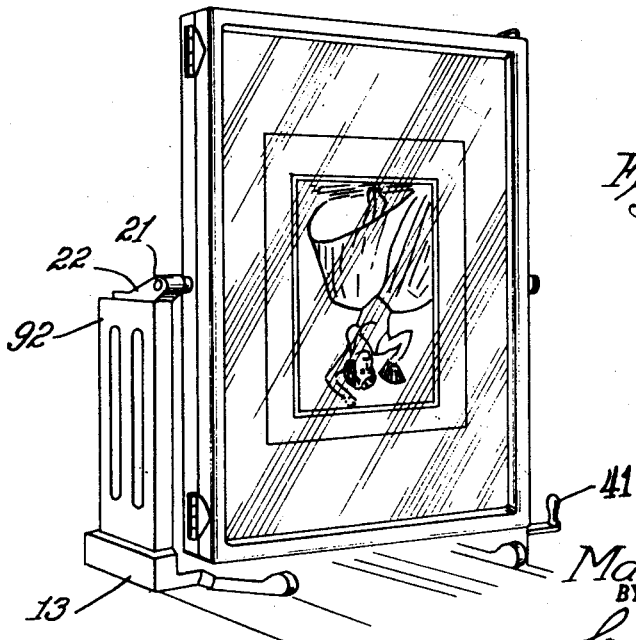
INVENTOR.
Max H. Sussin
BY Louis Robertson atty.

INVENTOR.
Max H. Sussin
BY Louis Robertson atty.

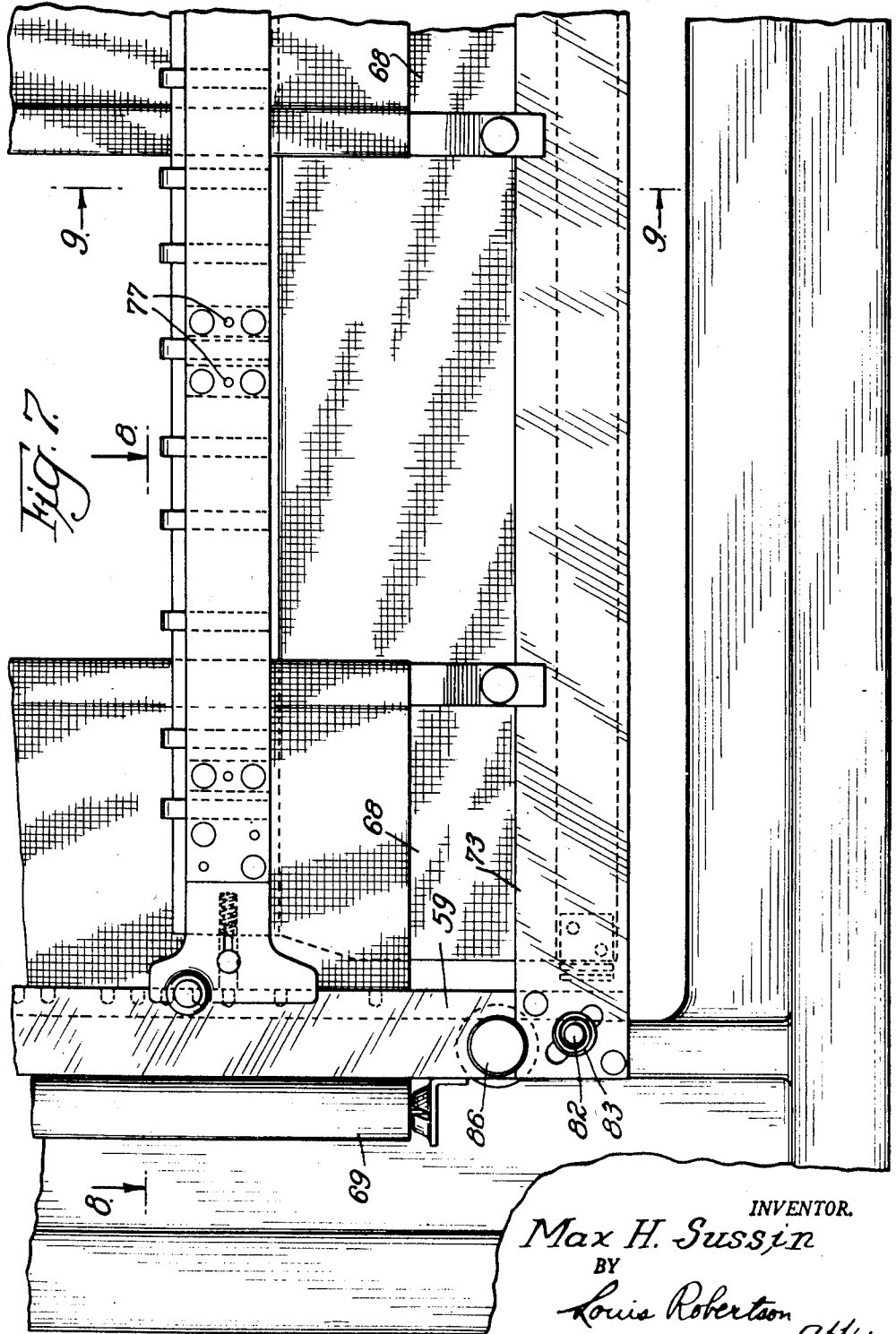

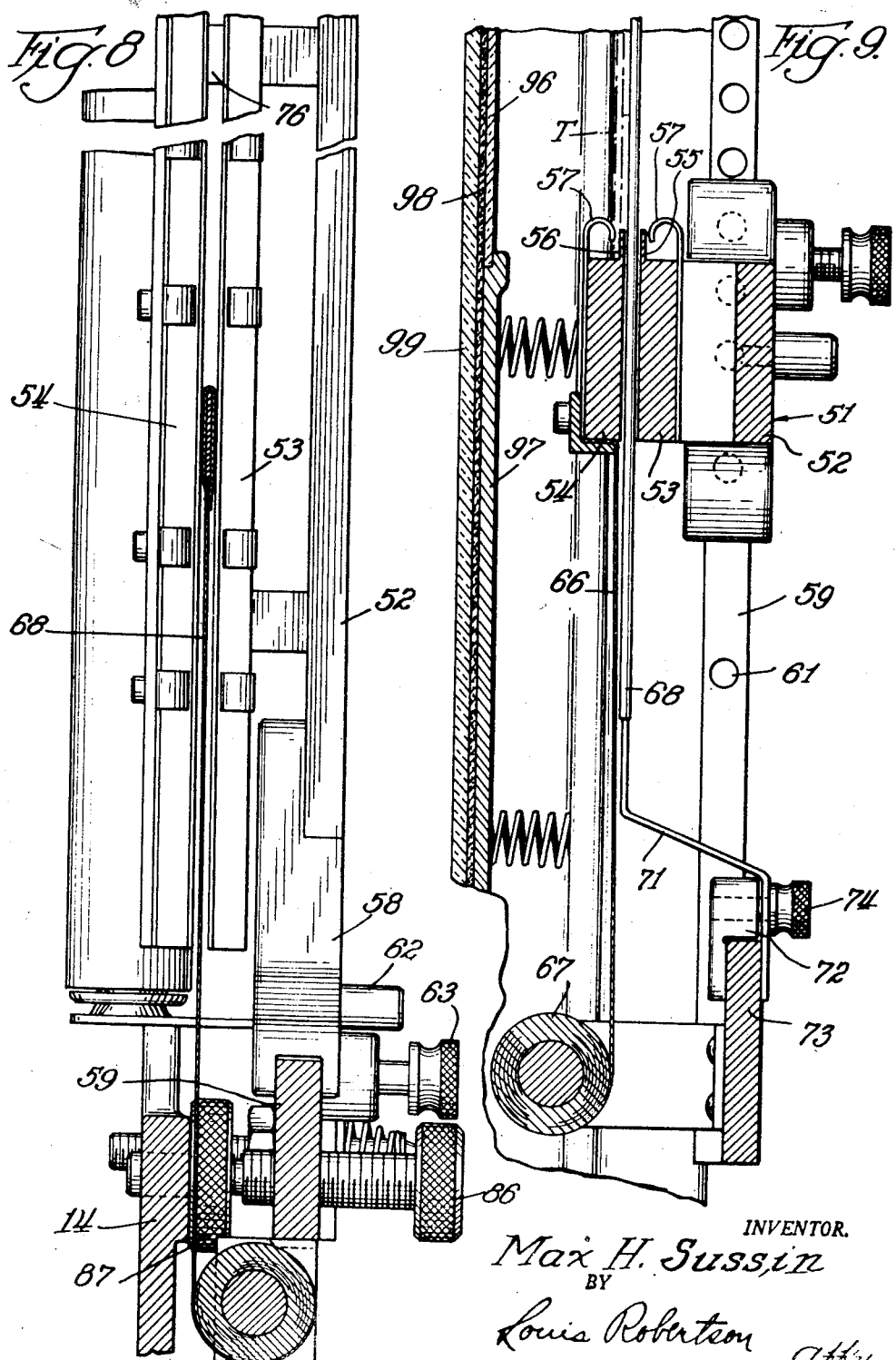

Patented June 20, 1950

2,512,182

UNITED STATES PATENT OFFICE 2,512,182

PHOTOENGRAVING COPYHOLDER

Max H. Sussin, Chicago, Ill., assignor to Benjamin Sugarman, Chicago, Ill.

Application September 30, 1946, Serial No. 700,293

14 Claims. (Cl. 88—24)

In photo-process cameras for photo-engraving, lithography, and other photo-mechanical reproduction it is important to have the copy accurately positioned in a known focal plane. The photo-engraving camera is conventionally provided with a movable copy holder and with scales which indicate the exact distance of the copy holder from the film holder. Knowing the distance of the copy from the film holder is complicated, however, by the fact that there are two broad classes of copy which are differently positioned in the copy holder. Opaque copy is normally pressed against a plate glass in front of it and is illuminated from the front. This requires one type of copy holder with a resilient back to press the copy against the glass plate. With transparencies, the light must come from behind the copy. The usual opaque cushion back must, therefore, be eliminated and a different copy holder used which merely engages the copy transparency, or the plates holding it, along the edges.

Heretofore, there has been no really convenient and satisfactory device for changing from one type of copy holder to the other, and the two copy holders did not hold the copy at the same focal plane. The result was that, if the scale were correct for one copy holder, it was quite wrong for the other.

According to the present invention, a combined copy holder is provided which is easily converted from a copy holder of one type to a copy holder of the other type and which holds both opaque copy and transparent plates in the same focal plane so that with both types, the scale will correctly indicate the distance of the copy from the film holder. The shift from one type of copy holder to the other is made simply by turning the copy holder over, or reversing it, this being done easily because the copy holder is pivotally mounted about a central axis.

In addition, the transparency copy holder is provided with exceptionally convenient masking curtains, which can be very easily operated to shut out excessive light which would cause fogging of the film or color distortion. The transparency copy holder is further provided with unusually simple means for flexing the copy to correct for distortions thereof.

Additional objects and advantages of the invention will be apparent from the following description, and from the drawings, in which:

Figure 2 is a perspective view of the copy holder and carriage seen in Figure 1, showing the transparency-holding side of the copy holder;

Figure 3 is a fragmentary perspective view showing the side of the copy holder adapted to hold opaque copy;

Figure 1:
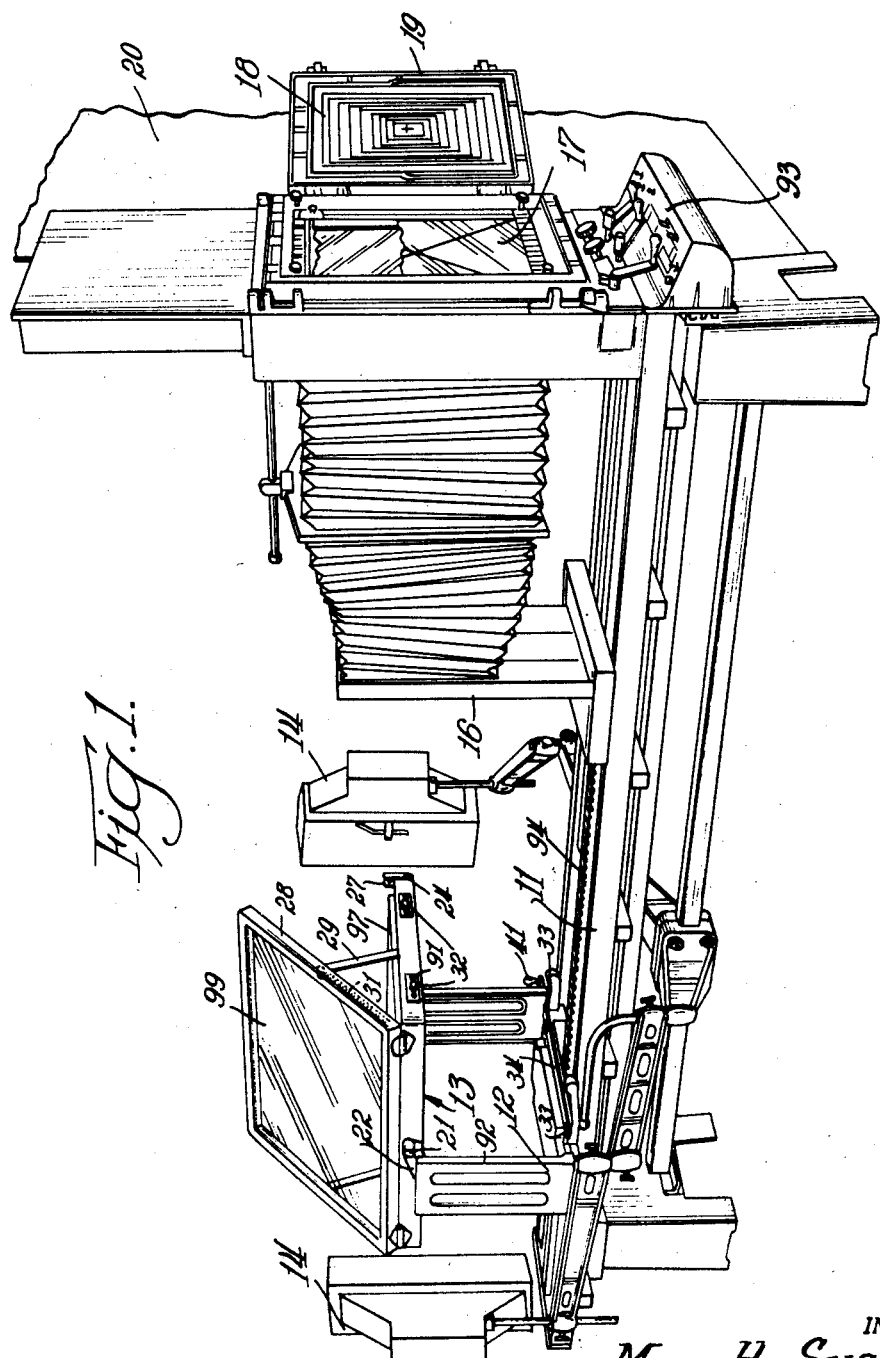
Figure 1 is a perspective view of a photoengraving camera embodying this invention.

Figures 7, 8 and 9 are views showing details of the copy holder and masking curtains, Figure 7 showing the front of the transparency holder, and Figures 8 and 9 showing fragmentary sectional views thereof taken approximately on the lines 8—8 and 9—9 respectively.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description of camera

The invention has been illustrated in conjunction with a photo-engraving camera of the dark room type. A camera bed 11 is provided with a copy holder carriage 12 on which a copy holder 13 is mounted. The films are illuminated by lamps 14, and are filmed through a lens carried on a lens board 16 movable on the bed 11. The lens of lens board 16 focuses an image of the copy either on ground glass 17 or on a film carried by a film holder 18, but which during exposure of the pictures is swung to the position of the ground glass 17 in Figure 1. The film holder 18 and the ground glass 17 are preferably located within a dark room built to receive the film end of the camera, an opaque flexible curtain 20 bridging between the film end of the camera and the walls of the dark room to shut off all light from the outside.

The present invention relates particularly to the copy holder 13, and its carriage 12.

Mounting of copy holder

As seen best in Figures 1 to 3, the copy holder 13 is pivotally carried by the carriage 12. To this end, the copy holder may be journaled on stub shafts 21 carried by bearing brackets 22 of the carriage. The reason for mounting the copy holder in this manner is to facilitate its use for two different purposes.

Opaque copy

Figure 4:
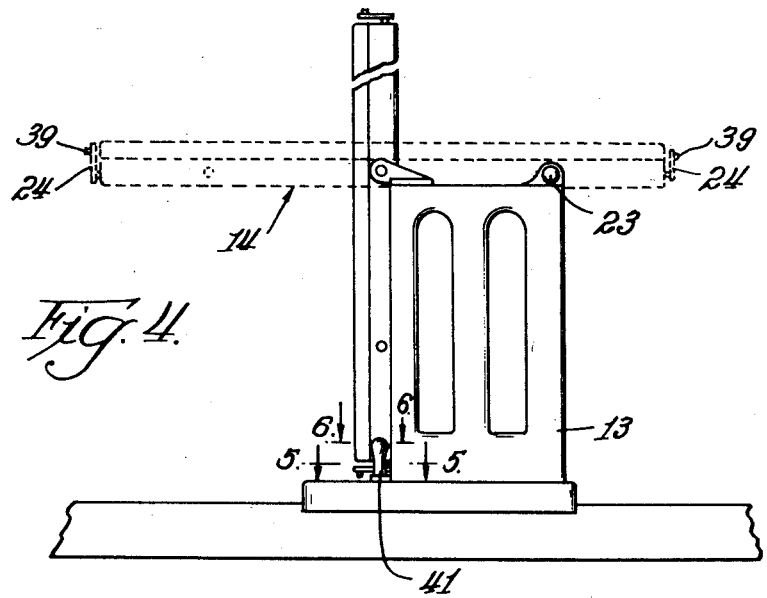
Figure 4 is a fragmentary side view showing the side of the copy holder and carriage.
Figure 6:
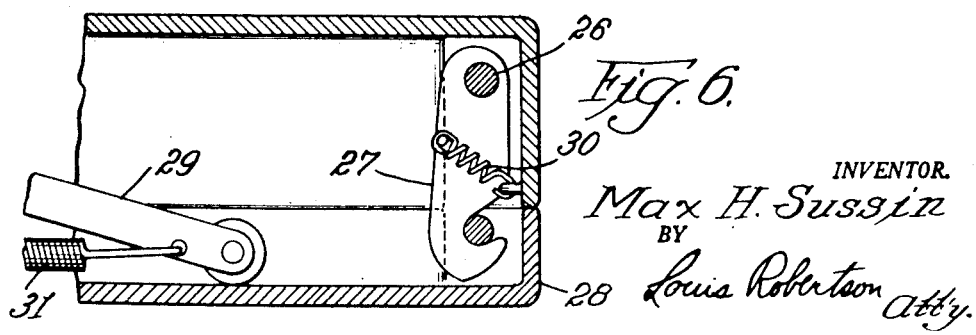
Figure 6 is a fragmentary sectional view, taken approximately on the line 6—6, showing details of the cover latching mechanism and cover counter-balance.

When an opaque copy is to be used, the copy holder is pivoted to the horizontal position shown in Figure 4. In this position it is locked by a spring-urged plunger 23, which engages a slot or notch in the copy holder 13, or in a stub carried thereby. While the copy holder 13 is in a horizontal position, either of the handles 24 may be turned to turn the shaft 26, from which the handles are rigidly mounted. Turning the shaft 26 releases the latch 27, seen in Figure 6, so that the cover 28 may be raised, as seen in Figure 1. The cover 28 includes a heavy frame and a heavy plate of glass, and hence it is counter-balanced, as by links 29 urged toward the position shown in Figure 1 by springs 31 seen in Figure 6. While the cover is held in the upper position by links 29, copy may be placed thereunder, being placed on a resilient backing board so that when the cover is closed the copy will be pressed flat between the backing board and the glass plate of the cover. Of course it will be automatically latched closed when it is lowered on account of the latch 27 being biased in the latching direction by spring 30, Figure 6.

Locking apparatus

Figure 5:
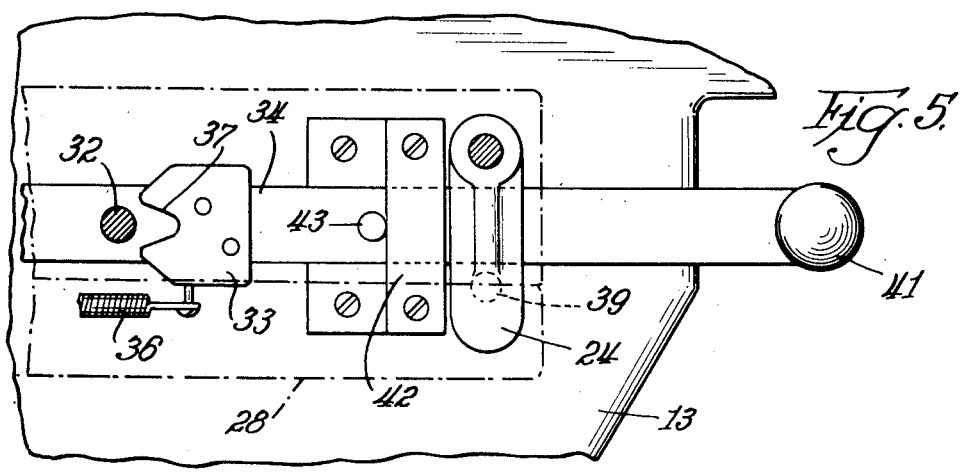
Figure 5 is a fragmentary sectional view, taken approximately on the line 5—5 of Figure 4, showing the mechanism for locking the copy holder in vertical position and locking the cover latch mechanism.

It is important that the copy holder be locked in either vertical position without any play, since such play could result in a shifting of the copy from a true focal plane. Accordingly, each end of the copy holder 13 is provided with a locking stub 32. Each of these locking stubs 32 is engaged by a locking block or latch 33 rigidly secured to a latch bar 34, which is spring urged by a pin 36 toward the left, as seen in Figure 5. The notches 37 in latches 33 are shaped with inwardly converging walls so that they, or at least one of them, will firmly grip the pin 32, and thus accurately and dependably hold the film holder 13 in a truly vertical position so that the copy will lie exactly in a focal plane. The latches 33 are shaped so that upon being hit by a pin from either side they will shift to allow the pin to reach the locking position. As seen best in Figure 4, a stop lug 39 is provided on each handle 24 to engage the latch bar 34 so that the pin 32 cannot pass much beyond the latching position as it enters the latching area.

The latch rod 34 is provided with a suitable handle 41 with which it may be withdrawn to release the latch, and permit the copy holder 13 to be swung on its horizontal axis.

The carriage 12 is provided with a lock block 42 through which the latch bar 34 slides, and which is positioned to lie close to either handle 24 when the end of the copy holder carrying that handle is swung downwardly to the latching position. This positively blocks the unlocking movement of handle 24. But for this there would be a possibility that someone would accidentally turn handle 24 and release latch 27 with the copy holder vertically disposed. If this happened, the spring 31 would make the door 28 fly open, because the weight of the door would no longer oppose the strength of spring 31. Serious accidents could result.

The lock bar 42 may also be used for limiting the movement of latch bar 34, a stop pin 43 being provided on the bar 34 to strike lock bar 42.

Transparency holder

When transparencies are to be photographed, the side of the copy holder seen in Figure 2 is turned toward the lens, and the resilient backing means is taken out of the copy holder 13 so that the transparency may be eliminated from the rear of the copyholder. The transparency (or a portable holder which may carry a transparency) is then held at its top and bottom edges by seat bar assemblies 51. The construction of the lower seat bar assembly 51 is best seen from Figures 7, 8, and 9. As seen best in Figure 9, the seat bar structure 51 includes three bars, namely, a positioning bar 52, a forward seat bar 53, and a rearward seat bar 54. The seat bar 53 includes a machined seat 55, and seat bar 54 includes a similar seat 56 facing in the opposite direction. A film may be held against either of these seats by a series of spring clips 57 associated therewith. In Figure 9 a transparency is indicated in dotted lines held against seat 56 by the associated clips 57.

Seat bar 53 is rigidly secured at spaced points to positioning bar 52. The positioning bar is provided at its ends with slides 58, which engage the side members 59 of the transparency holding frame. The side members 59 are preferably provided with a plurality of recesses 61, into which a bolt controlled by knob 62 may enter to lock the positioning bar 58 at a desired height for a particular size of transparency. The positioning bar 58 is also provided with a screw 63 for tightening it firmly against the side member 59 so that there will be no play in the parts to cause inaccuracies in the positioning of the seats 55 and 56.

The upper seat bar structure may be substantially the same as that just described, although it preferably has the clip members corresponding to the forward clip members 57, most commonly used, mounted on a pivotal bar so that these clips may be swung out of the way while inserting a transparency, and then swung back to resiliently press the transparency against the seat. Also, the bolt similar to that controlled by knob 62 is preferably omitted because the upper seat bar will be drawn down to exactly the right height for a particular transparency and locked with a thumb screw, rather than merely being approximately positioned by fitting a bolt into a recess.

Curtains

As each of the seat bars is moved toward the center, it draws out with it a curtain 66. As seen best in Figure 9, each curtain 66 is secured to the rear seat bar 54, and is drawn from a roller 67, which is preferably a spring roller carried by the transparency holder frame.

It is also preferred that side curtains 68 be provided, these curtains being drawn out from spring rollers 69. The curtains 68 preferably extend between the two seat bars 53 and 54, and are drawn out by curtain rods 71, which are provided with sliding clamps 72 running on top and bottom bars 73 of the transparency holding frame. Screws 74 tighten the clamp 72 to hold the curtains 68 in any desired position.

In order that the curtains 68 may pass between the two seat bars 53 and 54, and may be drawn fairly closely together to permit the masking of a small transparency, the seat bar 54 is carried by means, including connecting block 76, engaging the bar 54 only near its longitudinal center. The seat bar 54 is somewhat flexible from and towards the lens, but there are no forces tending to flex it in this direction. As seen in Figure 9, its vertical dimension is large enough so that the bar is quite rigid in this direction, i. e., in its plane. It is dependably prevented from twisting in its plane by pins 77 extending through seat bar 53 through connecting block 76 and into seat bar 54, as well as by screws holding the parts in assembled relationship.

The entire transparency holding frame, including side bars 59 and top and bottom bars 73, is shiftably mounted with respect to copy holder 13. The shifting in its plane is permitted by four diagonally disposed slots 81 at the four corners of the frame. As best seen in Fig. 7, mounting stubs 82 extend through these slots, and the frame is inwardly urged on the stubs by a loading spring 83. The shifting of the frame angularly within its plane, permitted by slots 81, may be either manually, or by a motor 84 controlled from the dark room or film end of the camera.

It is also preferred that there be means for tilting the frame from its plane, or distorting the frame by shifting one corner thereof from its plane. To this end screws 86 are provided at two corners, as seen in Figure 2. As seen best in Figure 8, each screw 86 bears on a machined block 87 carried by the main frame of copy holder 13. It will be apparent that the screw 86 is free to slide on the face of block 87 as the transparency-holding frame is shifted in its plane.

Focal plane alignment

It is vital that all of the copy be accurately positioned in focal planes. The plane of the glass plate carried by the cover 28 may be accurately aligned about a vertical axis with a focal plane by adjustment of the two stub shafts 21. This is accomplished by shifting the bearing bracket 22 on the upright 92 of the carriage 12. Once the adjustment is made at the factory, the bracket 22 is pinned in place. Adjustment for the same purpose could be made by shifting the hinges of cover 28.

Adjustment of the plane of cover 28 about a horizontal axis may be made by adjusting the pins 32 at one end of the copy holder 13. These pins, therefore, are preferably carried by plates 91 adjustably mounted on the copy holder 13. The adjustment of these pins will not only adjust the angular position of the glass plate about the axis of the copy holder 13 but it will also permit the adjustment of the pins relative to one another so that they will both be engaged by the latches. Latch block 33 may also be adjusted. It is preferred that all adjustments be pinned or otherwise made permanent.

After all of the foregoing, the transparency frame may be aligned with a focal plane. The pins 32, which are lowermost when the transparency frame faces the camera, may be adjusted for controlling the angular position of the transparency frame about the axis of the holder 13. Alignment about the vertical axis may be obtained by adjustment of stop members 95, against which the transparency frame is urged by loading springs 83 when the screws 86 are not brought into action.

The scale tapes for indicating the position of the carriage 12 on the bed 11 are preferably adjusted for accurately indicating the distance of one or more of the copy planes from the film. It is preferred that the inside surface of the glass of cover 28, which comprises the copy plane for opaque copy, have exactly the same position when opaque copy faces the camera as does the seat 55, if the copy holder is swung over without moving the carriage 12. These are the two copy planes most commonly used, and it will then be possible to make the scale tapes read accurately for both of them. The seats 55 may thus be aligned with the copy plane for opaque copy by adjustment of the stops 95.

It may be preferred by some that the opaque copy plane lie midway between the plane of seat 55 and the plane of seats 56, so that each of these planes will be quite close to the opaque copy plane.

Illumination of transparency

A plate 96 of opal or other light-diffusing glass is built into the resilient back 97 as seen in Figure 9. A rectangle 98 of felt padding may be removed from the felt padding forming the face of the resilient back 97 to expose the opal glass 96 (through glass 99) to light from lamps 14. The brightly illuminated opal glass 96 behind the transparency will properly illuminate the transparency. The resilient back 97 is a rigid plate, suitably stiffened with ribs or flanges, and suitably spring mounted, the springs being disposed so as not to interfere with the illumination of the transparencies. It should be noted that the felt pad is commercially much thicker than has been illustrated.

Carriage movement

The carriage 12 and the lens board 16 are independently moved along the bed 11 by a turning of a pinion carried by each of them, and engaging a rack 94. The rack is preferably centered transversely of bed 11, so that it does not create any twisting forces.

There are preferably two scales, both giving the same reading, one scale being visible in the dark room on the instrument panel 93, and the other scale being visible adjacent the copy holder. Likewise, a scale is preferably provided for the lens board 16, which is visible through the instrument panel 93. The scale which is visible from the adjacent copy holder 13 may also be visible adjacent the lens board 16, so that its position may also be determined from adjacent thereto.

From the foregoing it is evident that a copy holder has been provided which may very easily be converted for use for opaque copies, or use for transparencies. In both instances the copy will be held accurately to the focal plane. The focal plane for opaque copy will be substantially the same as that for transparencies, so that the scales indicating copy positions may read accurately, or reasonably accurately, for both types of copy.

It is also evident that the present invention provides a copy holder for transparencies in which the area surrounding the transparency is easily masked off, so that relatively little stray light will enter the camera. In addition, the inadvertent unlatching of the copy holder cover while it is in vertical position is positively prevented.

I claim:

1. A combined copy holder for photo-engraving cameras including a frame pivotally mounted by the carriage to pivot approximately about its center of gravity to present different faces toward the camera, copy holding means for opaque copy on one face of the frame, including a glass plate and a resilient back for pressing the copy against the inner face of the glass plate, and copy holding means for transparencies on the other face of the frame including focal plane seats adapted to engage the transparencies along the edges thereof, and means for resiliently pressing the transparencies against said seats; the inner face of said glass plate lying in substantially the same plane with respect to the pivotal axis, when the glass is in its position of use, as do said seats when they are in the position of use; said resilient back including a light-transmitting portion for illumination of the transparencies therethrough.

2. A copy holder including a pivotally mounted base, a frame for carrying a glass plate hinged to the base, means for locking the base in horizontal disposition for placing copy in the holder and in vertical disposition for photographing copy in the holder, spring counter-balance means for assisting in raising the hinged frame when the copy holder is horizontally disposed, a latch for holding the frame closed, and means automatically made effective upon turning the base to its vertical disposition to positively prevent opening of the hinged frame.

3. A copy holder including a pivotally mounted base, a frame for carrying a glass plate hinged to the base, means for locking the base in horizontal disposition for placing copy in the holder and in vertical disposition for photographing copy in the holder, spring counter-balance means for assisting in raising the hinged frame when the copy holder is horizontally disposed, a latch for holding the frame closed, and means automatically made effective upon turning the base to its vertical disposition to positively prevent opening of the hinged frame, comprising stationary shoulder means positioned when the base is vertically disposed to block the release of said last-named latch.

4. A copy holder including a carriage, a base pivotally mounted thereon, a frame for carrying a glass plate hinged to the base, means for locking the base in horizontal disposition for placing copy in the holder and in vertical disposition for photographing copy in the holder, spring counter-balance means for assisting in raising the hinged frame when the copy holder is horizontally disposed, a latch for holding the frame closed, and means automatically made effective upon turning the base to its vertical disposition to positively prevent opening of the hinged frame, comprising stationary shoulder means carried by the carriage and positioned when the base is vertically disposed to block the release of said last-named latch.

5. A reversible copy holder including a carriage, a base pivotally mounted thereon, a frame for carrying a glass plate hinged to the base, means for locking the base in horizontal disposition for placing copy in the holder and in vertical disposition turned either way from the horizontal for photographing copy carried by the holder, spring counter-balance means for assisting in raising the hinged frame when the copy holder is horizontally disposed, a latch for holding the frame closed, a rod extending approximately radially of the pivotal axis and having a handle fast on each end thereof, stationary shoulder means on the carriage positioned to lie beside either handle means, which is turned toward the carriage by pivoting the base, to block the unlatching movment of the handle means.

6. A combined copy holder for photo-process cameras including a carriage adapted to move on the bed of the camera, a frame pivotally mounted thereto to present either face toward the camera, transparency-holding means carried at one face and means carried at the other face adapted to hold opaque copy, and including a transparent cover, a resilient backing having a light-diffusing plate, and a pad pressed by the plate toward the cover to press copy flat against the cover, at least part of the pad being readily removable from the plate to expose said plate to light entering through the cover.

7. A combined copy holder for photo-process cameras including a frame pivotally mounted to present either face toward the camera, transparency-holding means carried at one face and adapted to engage the edges only of a transparency and means carried at the other face adapted to hold opaque copy, and including a transparent cover, a resilient backing having a light-diffusing plate, and a pad pressed by the plate toward the cover to press copy flat against the cover, at least part of the pad being readily removable from the plate to expose said plate to light entering through the cover.

8. A combined copy holder for photo-engraving cameras including a carriage movable on the bed of the camera, a frame pivotally mounted by the carriage to pivot approximately about its center of gravity to present different faces toward the camera, a copy holding means for opaque copy on one face of the frame including a glass plate and a resilient back for pressing the copy against the inner face of the glass plate, and copy holding means for transparencies on the other face of the frame, including focal plane seats adapted to engage the transparencies along the edges thereof, and means for resiliently pressing the transparencies against said seats; the inner face of said glass plate lying in substantially the same plane with respect to the pivotal axis, when the glass is in its position of use, as do said seats when they are in the position of use; said copy holder when arranged for holding transparencies being adapted for the illumination of the rear sides of the transparencies.

9. A combined copy holder for photo-engraving cameras including a carriage movable on the bed of the camera, a frame pivotally mounted by the carriage to pivot approximately about its center of gravity to present different faces toward the camera, copy holding means for opaque copy on one face of the frame including a glass plate and a resilient back for pressing the copy against the inner face of the glass plate, and copy holding means for transparencies on the other face of the frame, including focal plane seats adapted to engage the transparencies along the edges thereof, and means for resiliently pressing the transparencies against said seats; the inner face of said glass plate lying in substantially the same plane with respect to the pivotal axis, when the glass is in its position of use, as do said seats when they are in the position of use, any opaque material forming a part of the resilient back in alignment with the position in which the transparencies are placed being removable to permit illumination of the transparencies from the rear.

10. A copy holder including a pivotally mounted base, a frame for carrying a glass plate hinged to the base, means for locking the base in horizontal disposition for placing copy in the holder and in vertical disposition for photographing copy in the holder, spring counterbalance means for assisting in raising the hinged frame when the copy holder is horizontally disposed, a latch for holding the frame closed, and means automatically made effective upon turning the base to its vertical disposition to prevent movement of the latch to a position which would release the hinged frame.

11. A combined copy holder for photo-process cameras including a frame mounted to pivot about a horizontal axis to dispose the frame horizontally, or vertically with either face toward the camera, transparency-holding means carried at one face and adapted to engage the edges only of a transparency and means carried at the other face adapted to hold opaque copy, and including a transparent cover hinged and counter-balanced to open readily when the frame is horizontally disposed, a resilient backing having a light-diffusing plate, and a pad pressed by the plate toward the cover to press copy flat against the cover, at least part of the pad being readily removable from the plate to expose said plate to light entering through the cover.

12. A combined copy holder for photo process cameras including a support, a single copy holder unit mounted on said support by bearing means having a horizontal axis for pivoting the copy holder unit for presenting either face toward a camera at one side of the copy holder and to present one face uppermost, a transparent cover carried at the face thus presented uppermost, a resilient back for pressing opaque copy against the inside of said transparent cover, and transparency holding means for exposing transparencies from the opposite face of the copy holder unit; said copy holder unit including a light diffuser lying across the optical axis, positioned between the transparent cover and the transparency holding means and spaced from the transparency holding means, and said copy holder being adaptable for the transmission of light successively through the transparent cover, the light diffuser, and a transparency on said transparency holding means when the copy holder unit is used for transparencies.

13. A combined copy holder for photo-process cameras including a frame pivotally mounted to present either face toward the camera, transparency-holding means carried at one face and adapted to engage the edges only of a transparency and means carried at the other face adapted to hold opaque copy, and including a transparent cover, a light-diffusing plate, and a pad between the plate and the cover pressed resiliently toward the cover to press copy flat against the cover, at least part of the pad being readily removable to expose said plate to light entering through the cover.

14. A combined copy holder for photo-engraving cameras including a carriage movable on the bed of the camera, a frame pivotally mounted by the carriage to pivot approximately about its center of gravity to present different faces toward the camera, copy holding means for opaque copy on one face of the frame including a glass plate and a resilient back for pressing the copy against the inner face of the glass plate, and copy holding means for transparencies on the other face of the frame, including focal plane seats facing rearwardly away from the camera when in the position of use and adapted to engage the front of the transparencies along the edges thereof, and means for resiliently pressing the transparencies against said seats; the inner face of said glass plate lying in substantially the same plane with respect to the pivotal axis, when the glass is in its position of use, as do said seats when they are in the position of use, whereby with the camera and carriage positions unchanged after use of the frame with opaque copy correctly focused, the frame may be swung about for use with a transparency correctly focused, the seats for the transparency then lying at the same distance from the camera as the inner face of the glass previously did; said copy holder being adaptable for the transmission of light therefrom through the transparencies when used for transparencies.

MAX H. SUSSIN.

REFERENCES CITED

The following references are of record in the file of this patent:

UNITED STATES PATENTS

| Number | Name | Date |
| --- | --- | --- |
| 1,141,704 | French | June 1, 1915 |
| 1,214,132 | Carleton | Jan. 30, 1917 |
| 1,650,132 | Jones | Nov. 22, 1927 |
| 1,813,689 | Weisker | July 7, 1931 |
| 1,834,897 | Caps | Dec. 1, 1931 |
| 2,257,581 | Ulsheimer | Sept. 30, 1941 |
| 2,352,221 | Phillips | June 27, 1944 |

FOREIGN PATENTS

| Number | Country | Date |
| --- | --- | --- |
| 863,452 | France | Jan. 2, 1941 |